United States Patent [19]

Taricco

[11] Patent Number: 5,040,918

[45] Date of Patent: Aug. 20, 1991

[54] OIL BOOM AND METHOD

[76] Inventor: Todd L. Taricco, 3806 El Tesoro Pl., Rancho Palos Verdes, Calif. 90274

[21] Appl. No.: 512,876

[22] Filed: Apr. 23, 1990

[51] Int. Cl.$^5$ ............................................. E02B 15/06
[52] U.S. Cl. ...................................... 405/66; 156/78; 210/923; 405/72
[58] Field of Search .................................. 405/63–72; 156/78, 79; 210/242.3, 923

[56] References Cited

U.S. PATENT DOCUMENTS

| | | | |
|---|---|---|---|
| 3,577,879 | 5/1971 | Ducrocq | 405/72 |
| 3,592,008 | 7/1971 | Trindle | 405/67 X |
| 3,653,213 | 4/1972 | Childers | 405/63 |
| 3,710,577 | 1/1973 | Matheson | 405/72 X |
| 3,792,589 | 2/1974 | Sayles | 405/72 X |
| 3,849,989 | 11/1974 | Preus | 405/72 X |
| 4,073,143 | 2/1978 | Preus | 405/72 X |
| 4,123,911 | 11/1978 | Finigan | 405/68 |

FOREIGN PATENT DOCUMENTS

| | | | |
|---|---|---|---|
| 993672 | 7/1976 | Canada | 405/66 |
| 2910975 | 10/1980 | Fed. Rep. of Germany | 405/66 |
| 1529754 | 5/1968 | France | 405/63 |
| 2117326 | 10/1983 | United Kingdom | 405/63 |

Primary Examiner—David H. Corbin
Attorney, Agent, or Firm—Blakely, Sokoloff, Taylor & Zafman

[57] ABSTRACT

Floating containment booms for containing petroleum and similar product spills on a water surface such as at sea, in harbors, rivers and the like, and methods for forming the same. In accordance with the method, an elongate sheet of flexible material and components for mixing to form a plastic foam or a foam forming or expanding material together with apparatus for forming the containment boom therefrom are stored for use when required. In operation on a boat, the apparatus forms a loop or opens a preformed loop or loops in the material, at the same time injecting the foam forming material in the loop so formed to expand and fill the same with foam at the same is played out from the boat while traversing the region to be surrounded by the oil boom. The portion of the elongate sheet opposite the loop is preferably weighted, either prior to use or as the oil boom is formed and played out from the boat. Various embodiments are disclosed, including embodiments having a sea anchor-like provision on the lower part thereof so that the portion of the elongate sheet which hangs down under water under the foam filled loop is restricted from rising and given a large apparent mass in agitated water by the sea anchor-like action thereof.

55 Claims, 5 Drawing Sheets

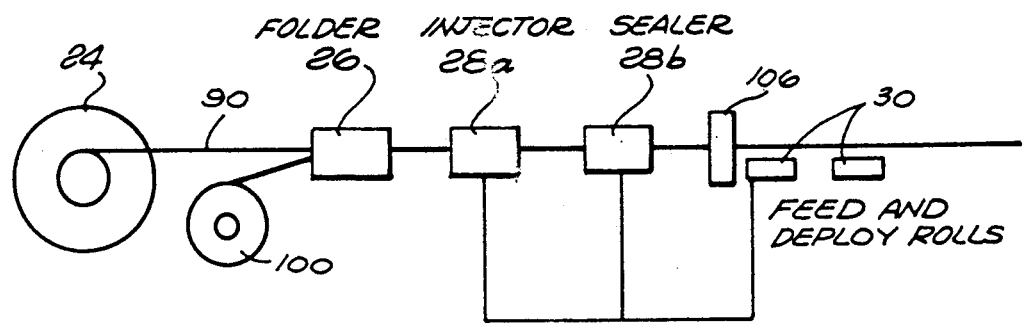
FIG. 12
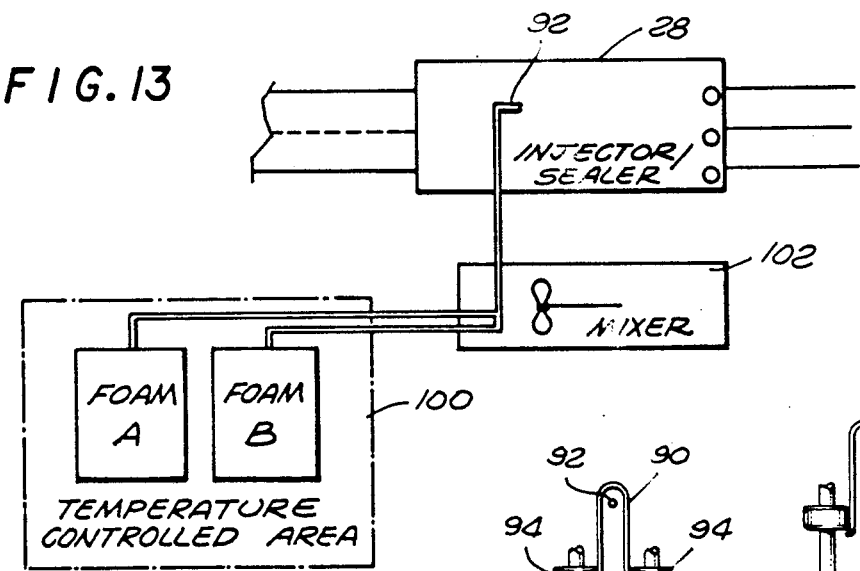
FIG. 13
FIG. 14
FIG. 15
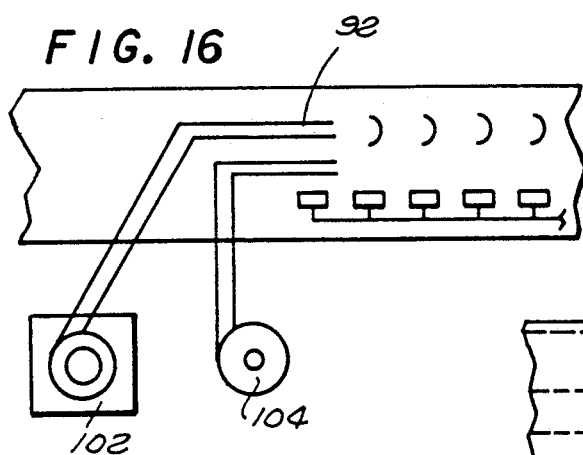
FIG. 16
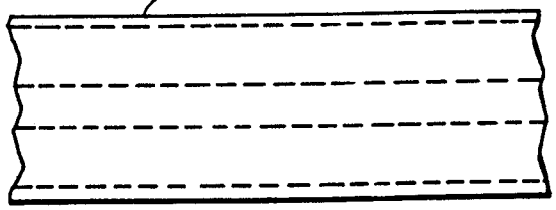
FIG. 17

OIL BOOM AND METHOD

BACKGROUND OF THE INVENTION

1. Field of the Invention

The present invention relates to the field of floating containment booms for restricting the dispersion of petroleum and similar products on the surface of a body of water and for facilitating the recovery and cleanup thereof.

2. Prior Art

The frequency of accidental petroleum spills both at sea as well as in harbors, rivers and the like and the detrimental and long-lasting effects thereof have been subject to ever increasing publicity. This, together with the potential for civil as well as possibly criminal liability for such spills and loss of business because of the adverse publicity, has created increased pressure to both reduce the frequency of such spills and to much better limit the effects of a spill if and when the same does happen.

When a product such as a petroleum product is spilled onto or into a waterway such as by the collision of ships, the running aground of the same, an underwater pipe rupture or the like, the spill will float on the surface of the water in a puddle which will steadily increase in area, and decrease in thickness at least once further spillage is stopped, until the puddle becomes thin enough for the same to breakup into a large plurality of oil covered areas too thin, too large and too numerous for meaningful clean-up from the water. If on the other hand the puddle can be contained before the same grows to an unmanageable size, such as by surrounding the same with an appropriate floating oil boom, the floating oil may be contained from further spreading and removed from the water's surface in a reasonably efficient manner, grossly minimizing the effects of the spill. The key however is in being able to reach the spill site with a sufficient length of oil boom early enough to contain the spill before the same spreads, as may be accelerated by currents, winds, rough water, etc., to cover too large an area to be contained by the oil boom available and in a manner which will allow the efficient recovery of the oil from the surface of the water. For this purpose, it is necessary to deploy an oil boom of sufficient length on site within the first hour or so of a typical spill if the stated objectives are to be achieved.

One of the problems with prior art oil booms is the fact that the same are relatively large for any substantial length thereof, making them expensive, difficult to store and difficult to transport to a spill site and deploy. These factors also usually mean that the length of oil boom available at a typical spill site is usually relatively limited, and for a substantial spill that is at all remotely located, typically the boom is available at the spill site way too late to confine the already relatively well spread-out spill. Thus there is a need for a substantial improvement in the storability of oil booms, the rate at which the same may be delivered on site to a spill and the amount of oil boom which may be quickly and efficiently deployed using both available boats and other equipment.

Attempts have been made in the past to overcome these difficulties with typical prior art oil booms by somehow storing the same in a more compact state, returning the same to the usable state upon deployment. By way of example, U.S. Pat. No. 4,123,911 discloses an oil control system wherein the boom has a longitudinally disposed first chamber for inflation with air and a parallel longitudinally disposed second chamber for inflation with water. The boom itself is stored in a folded, deflated state so that the boom must be inflated from the opposite end thereof. Accordingly, one end of the boom is fastened to apparatus on the ship for inflating the two chambers as more and more of the boom is played out in a very shallow U-shape until the other end of the boom is reached. When deployed in this manner, both ends of the boom are then connected to the same ship, and at that time do not circle the oil spill. Accordingly a second boat must be used to take one end of the boom and drag the same to deploy the boom to its desired position. Obviously the waterfilled chamber of the boom will strongly resist movement of the same through the water other than perhaps along the length of the boom, so that even after the boom is inflated with air and water as described, it will take a substantial length of time to move the boom through the water to a useful position encircling the spill, so that the advantages of small storage volume and inflation during deployment seem to be offset by the difficulties and time required to move the inflated boom to a functional position around an oil spill. Also, it would seem that the material for the boom would have to be very strong, and perhaps cable reinforced, as the movement of the inflated boom is of course accomplished by pulling only on one or both ends thereof. Further, apparently constant inflating is contemplated to maintain the barrier inflation even after deployment. Inflatable containment booms have, however, enjoyed substantial commercial success though are still quite expensive.

Also relating to expandable booms is U.S. Pat. No. 4,480,800 disclosing apparatus for reeling floating booms, particularly such as are self-expanding.

U.S. Pat. No. 3,731,491 discloses an oil containment boom comprised of an elongated strip of corrugated metal which in one form is provided with flotation by means of a strip of plastic material adhesively secured to the corrugated metal. In that form of course the oil boom as deployed is in the same form as that stored, though in another form the flotation means is supplemented with the aid of outrigger or stabilizer floats. A similar system is disclosed in U.S. Pat. No. 3,807,617 wherein the floats are installed to the sheet member as the same is being deployed. Thus deployment requires an operator of the boat as well as an assembler for putting the floats on the sheet material as the same is being played out from a reel, the latter it would appear limiting the allowable speed of deployment and creating the possibility of personal injury to the assembler because of the individual's lack of control over the varying tension and side forces in the sheet material being played out from the rolling and pitching of the boat. As shall subsequently be seen, the present invention eliminates the need for an assembler, essentially allowing the oil boom to be automatically fabricated into its useful state as part of the deployment process and to remain in its useful state without constant inflation.

BRIEF SUMMARY OF THE INVENTION

Floating containment booms for containing petroleum and similar product spills on a water surface such as at sea, in harbors, rivers and the like, and methods for forming the same. In accordance with the method, an elongate sheet of flexible material and components for mixing to form a plastic foam or a foam forming or expanding material together with apparatus for forming the containment boom therefrom are stored for use when required. In operation on a boat, the apparatus forms a loop or opens a preformed loop or loops in the material, at the same time injecting the foam forming material in the loop so formed to expand and fill the same with foam as the same is played out from the boat while traversing the region to be surrounded by the oil boom. The portion of the elongate sheet opposite the loop is preferably weighted, either prior to use or as the oil boom is formed and played out from the boat. Various embodiments are disclosed, including embodiments having a sea anchor-like provision on the lower part thereof so that the portion of the elongate sheet which hangs down under water under the foam filled loop is restricted from rising and given a large apparent mass in agitated water by the sea anchor-like action thereof.

BRIEF DESCRIPTION OF THE DRAWINGS

FIG. 12 is a block diagram illustrating typical apparatus for fabricating the oil booms of the present invention.

FIG. 13 is a block diagram of a typical foam system used with the present invention.

FIG. 14 is a schematic representation of the foam injector and sealer.

FIG. 15 is an illustration similar to FIG. 14 showing the sealing of a weight/sea anchor chamber on the skirt of a containment boom.

FIG. 16 is a schematic representation of an alternate foam reactant injector and a fiber injector.

FIG. 17 is an illustration showing the preapplication of appropriate adhesives to the flexible material.

DETAILED DESCRIPTION OF THE INVENTION

Figure 1:
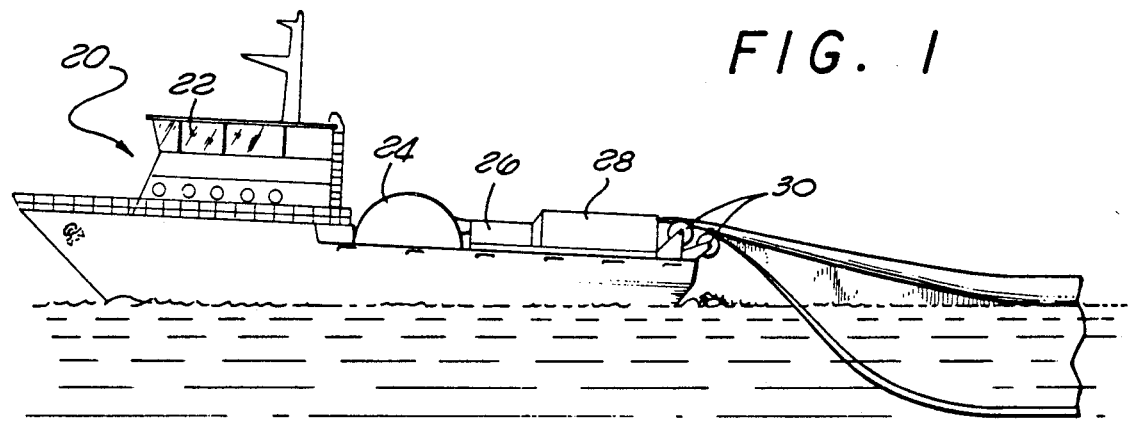
FIG. 1 is a side view of a boat illustrating the present invention containment boom and the apparatus for deploying the same.

First referring to FIG. 1, a side view of one embodiment of the present invention may be seen. In this embodiment a small boat, typically on the order of 30 to 60 feet in length, is outfitted in accordance with the present invention to carry and be capable of deploying on the order of one mile or more of oil boom on an as required basis. As shown in the figure, the boat, generally indicated by the numeral 20, aside from being characterized by an elevated control station 22 for visibility in all directions, is also characterized by a reel of an elongated strip of flexible material, typically plastic, from which the oil boom is formed during deployment. In that regard, as boat 20 proceeds along a course designed to surround the spill, the material wound on reel 24 is played out, passing first through what is referred to herein as a folder 26 if not prefolded, and then through a sealer/injector 28 which seals a loop in the material and injects mixed foam forming reactants into the loop, the material thereafter being guided over the stern of the boat by the roller system 30 with the foam expanding the compartment formed by the sealer into a float chamber to form the final oil boom configuration. During the process, an appropriate weight or weights may optionally also be attached or placed in position on the oil boom if the same is not preweighted.

Figure 2:
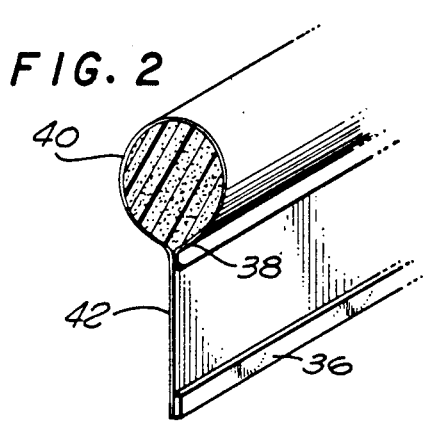
FIG. 2 is a cross section of one embodiment of oil boom of the present invention.
Figure 3:
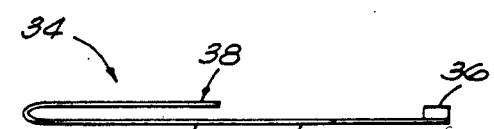
FIG. 3 is a schematic illustration of a flexible material from which the oil boom of FIG. 2 is fabricated.

The actual configuration of the oil boom deployed by the apparatus of FIG. 1 may take various forms as desired. By way of example, FIG. 2 illustrates a cross section of a basic form of oil boom that may be used, with FIG. 3 schematically illustrating the cross section of the material on roll 24 of FIG. 1 from which the boom is fabricated. As shown on FIG. 3, the sheet material 32, typically a plastic material, preferably a reinforced plastic material though other materials may also be used, is provided on the roll 24 with one edge thereof being folded over in region 34, and with a weight or series of weights 36 being pre-attached by bonding or other suitable means to the opposite edge of the material. When the material is provided in this folded state, folder 28 illustrated in FIG. 1 is not needed, the material passing directly on to the sealer, though when the material is provided unfolded, the folder will fold the same on deployment.

The sealer bonds or joins the two layers of material in region 36 to form a loop from 38 (see FIG. 2) into which the mixed uncured foam reactants are injected as the boom is played out over the stern of the boat. Typically, fast reacting foam reactants are used so the reactants quickly expand to effectively fill the loop 40, as shown in the cross section of FIG. 2. Being foam filled with a very light material, the foam filled loop will float relatively high in the water, following the motion of swells and small waves so as to strongly inhibit passage of the spilled product thereover. At the same time, weight 36 will hold the downward extending skirt 42 of the boom well down into the water to substantially restrict the passage of the spilled product thereunder. For purposes of specificity, the loop 40 might have a diameter of approximately 1 to 4 feet, with the weighted and/or water filled skirt 42 thereon hanging down therebelow approximately 2 to 8 feet. While many expanding materials could be used, open cell foams tend to be considerably lighter and thus require less reactant (unexpanded) volume and weight for a given foam volume. Open cell foams can be used since in general the foam filled loop 40 will be sealed against water penetration, and for the further reason that prolonged service of the oil boom in the water will in general not be required. Such flexible open cell foams are commercially available which when reacted will provide a flexible foam having the density of approximately 0.45 pound per cubic foot, which will provide a foam weight for such configuration of approximately 2.1 to 3.2 pounds per foot.

The weighted edge 36 for the material may in turn be on the order of approximately 1 to 2 pounds per foot, the same being bonded, cemented, stitched or otherwise attached to the skirt material 42 as desired. With respect to the sheet material itself, preferably a relatively thin, strong and flexible plastic material is used, such as by way of example, a 3 mil high density glass filled polypropylene, though other materials and other material thicknesses may be used as desired, provided care is taken to select a material which in the thickness to be used will be adequately resistant to the crude oil, petroleum products, or other products likely to be the subject of a spill. Candidate materials include nylon, nomex, mylar, kapton and aluminized kapton, the latter material possibly allowing the burning of the spilled product by being fire retardant and being useful in the ease of spills that inadvertently are already burning. Also of course, while thin materials maximize the length of boom materials that may be carried on a boat, greater thickness may be used, such as 1/32 or 1/16 inch thicknesses, by way of example. The joining of the two layers of materials in region 38, of course, may be accomplished using any of various techniques, such as by way of example, ultra-sonic welding, thermal-bonding, bonding by adhesive and the like, stitching or combinations of processes as suitable for the particular material being used. In that regard, joining the two layers by the use of an appropriate adhesive and/or solvent for solvent welding has the advantage of being easily applied by way of a spray or other technique, and of being fast and carried out with the minimum of equipment under the conditions expected to prevail. Sewing, on the other hand, is a process that is generally continuously valuable in speed from zero to a maximum, making this a desirable process to use also. In comparison to the foregoing parameters, it is appropriate to note that in the Valdez oil spill, the depth of oil in the spill was a little under 1 foot. The depth of the more recent spill along the coast of Huntington Beach, California was approximately eight inches.

Figure 4:
FIG. 4 is an illustration of the flexible material from which the oil boom of FIG. 5 is fabricated.
Figure 5:
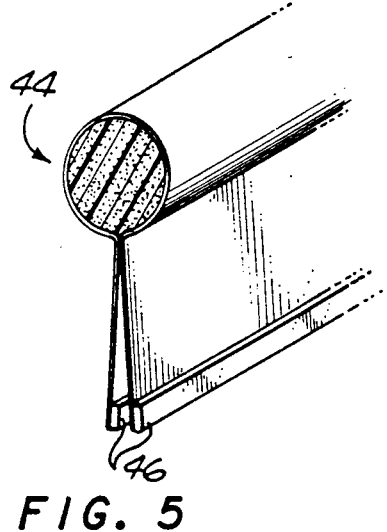
FIG. 5 is a cross section of an alternate of embodiment oil boom in accordance of the present invention.

The sheet material may of course be pre-folded in the region that will ultimately become loop 40, but is not pre-joined in region 38, as the injector for the mixed foam reactants must extend between the two layers of the material (See FIG. 3) and then into the loop to inject the reactants or expanding materials into the loop as the boom is being played out. In that regard, the rate of injection may be varied in proportion to the rate at which the oil boom is being played out to compensate for the differences in boat speed due not only to throttle settings, but wave conditions and swells and the like also. However, the particular form of the sheet material on the roll and the ultimate cross section of the oil boom may be varied to achieve the same functional result in a different manner. By way of example, the sheet material 44 of FIG. 4 is shown with a single U-shape fold with both opposite edges thereof being weighted by weights 46. Such a configuration, when the two layers thereof are joined at the appropriate location and filled with foam or expanded material, will provide a boom as shown in FIG. 5, the same having the advantage of being much less critical as to the exact lateral location at which the two layers are bonded or joined together, and in many respects effectively providing a double wall boom, both walls of which may be made sufficiently strong and adequately weighted to alone provide the desired function in the event the other skirt is non-functional or only partially functional for some reason.

Figure 6:
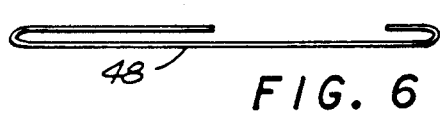
FIG. 6 is an illustration of the flexible material from which the oil boom of FIG. 7 is fabricated.
Figure 7:
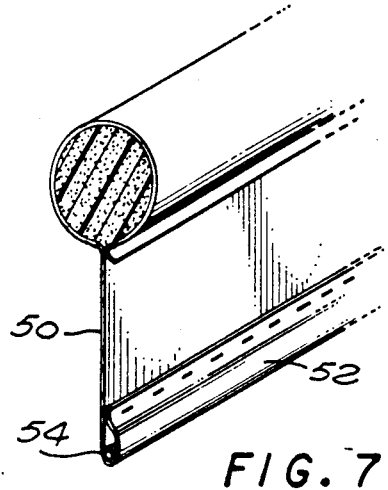
FIG. 7 is a cross section of a still further alternate embodiment of the containment boom.

FIGS. 6 and 7 provide a still further alternate form of oil boom, FIG. 6 illustrating schematically the folding of sheet material 48 as provided in a roll, and FIG. 7 illustrating the oil boom formed thereby. In this embodiment, the floating portion of the oil boom is substantially identical to that of FIG. 2, though along the lower edge of the skirt 50 of the boom of FIG. 7 is an additional fold 52 to form a small loop at the bottom of the skirt 50 into which is provided an elongated weight or a series of weights 54. Such weights could take various forms such as metallic strips, shot, or the like, though a continuous weight such as a solid or a stranded wire or cable is preferred as the same is easily provided in roll form, easily deployed automatically to be enclosed within the loop 52, and recoverable for reuse or recycling purposes upon recovery of the oil boom as shall be subsequently more fully described hereinafter. To insure that air is not trapped in the loop 52, the same may be perforated as shown in FIG. 7.

Figures 8, 9:
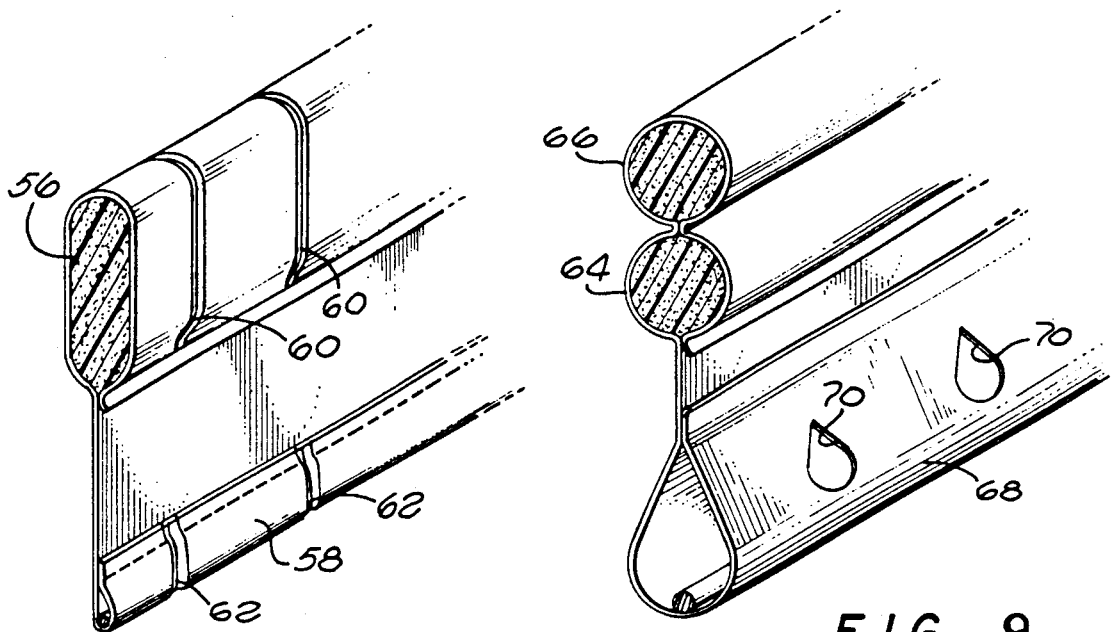
FIG. 8 is a cross section of a still further alternate embodiment of the containment boom.
FIG. 9 is a cross section of a still further alternate embodiment of the containment boom.

FIG. 8 shows a still further embodiment, similar in many respects to that of FIG. 7, though differing therefrom in two principle respects, namely that the foam-filled loop 56 is flattened somewhat, and the foam-filled loop 56 as well as the weighted loop 58 are both divided into a continuous line of individual chambers by bonding the opposite material layers together in regions 60 and 62, respectively. With respect to the foam-filled loop, this may readily be achieved by pinching the material at the appropriate locations as the foam rises and sets, and in the fold 58 by any convenient means, such as ultra-sonic welding, solvent welding, thermal bonding, application of an adhesive, or the like. With respect to pinching regions 60 as the foam rises and cures, fast acting foam may take on the order of 11 seconds to cure, though after approximately 4 seconds, the same would be stable enough so as not to require further pinching to retain the pinched shape. Obviously, other joining techniques could also be used, and/or the pinched regions heated to accelerate the reaction time and thus allow even a somewhat higher boat speed.

FIG. 9 illustrates a still further embodiment which may also be deployed using equipment of the type hereinbefore described. In this embodiment, two foam filled loops 64 and 66 are formed, one above the other. This has the advantage of reducing the amount of foam required for a given float height over that of a single circular foam filled loop such as that of FIG. 2 by 50%. Care must be taken however with respect to the weighting, etc, to avoid a configuration which will not be sufficiently oriented upright to avoid being blown down or knocked down by wave action so that the effective height of the boom is substantially the diameter of one of the two foam filled loops 64 and 66 rather than the combined height of the two taken together.

Also in the embodiment of FIG. 9, the loop 68 at the lower end of the skirt is purposely made quite large and is provided with openings 70 adjacent the top thereof which, when the same is pulled upward in the water by wave action, will tend to fill the loop 68 with water, thereby providing greater weight and stability to the boom, substantially reducing the tendency of the same to drift under the influence of the wind or to be pulled upward under the influence of choppy seas so as to allow oil to pass thereunder.

Figure 10:
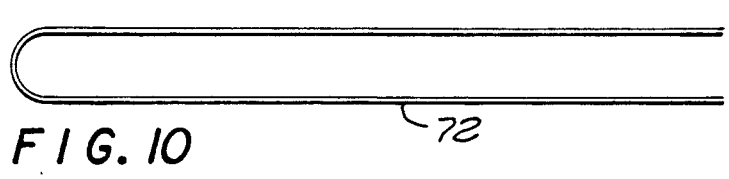
FIG. 10 is a schematic representation of the flexible material from which the containment boom of FIG. 11 is fabricated.
Figure 11:
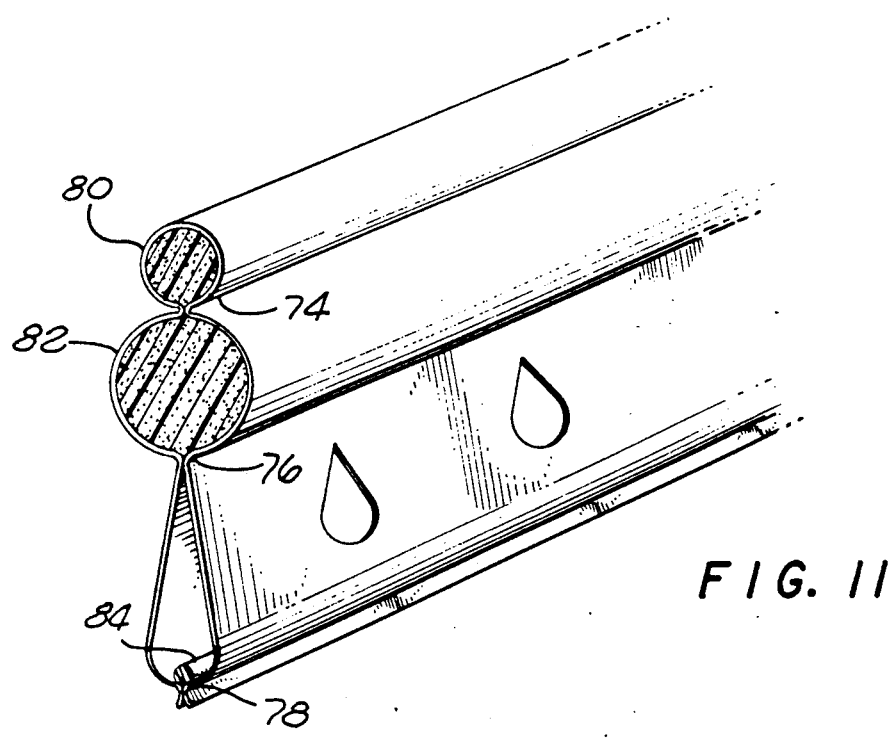
FIG. 11 is a cross section of a still further alternate embodiment of the containment boom.

One further embodiment is illustrated in FIGS. 10 and 11. This embodiment is formed from a simple folded sheet of material 72 (shown in FIG. 10), the two layers of material being joined together in regions 74, 76, and 78 with loops 80 and 82 both being foam filled, and a weight or series of weights 84 being disposed in the lowest loop prior to the two layers being joined in region 78. In this embodiment, loop 80 is purposely made to be approximately one half the diameter of loop 82. This reduces the tendency of the floating boom to be knocked down by the effects of wind and waves and at the same time reduces the extent of the knock down possible, yet only requires approximately 10% more foam for a given height of foam filled structure than that required for the embodiment of FIG. 9, and only approximately 55% as much foam for the same height of foam structure as the embodiments for FIGS. 2, 5 and 7. In that regard, one of the advantages of a configuration such as that of FIG. 8 is that the amount of foam required for a given height is reduced both by the presence of the pinched areas 60 and the flattening of the foam filled loop 56. Another advantage however, is that provided the pinched areas are sufficiently close together, the same will maintain the integrity of the float filled with an open cell foam even if a float chamber becomes so pierced and remains in the water so long as to become waterlogged. Obviously however, the forming of individual chambers by the use of pinched areas 60 of the embodiment of FIG. 8 may readily be incorporated in other embodiments such as have been illustrated in the other figures herein.

Now referring to FIG. 12, a block diagram of the system of FIG. 1 in a somewhat more complete form may be seen. As shown therein, the material coming off of roll 24, if not prefolded thereon, is folded by a folder 26 before passing onto the injector 28a and on to the sealer 28b, the same being shown as the single device 28 in FIG. 1. In general, it is preferred to have the injector nozzle extend into the folded area and then longitudinally aft to a position past the sealer so that the liquid reactants are confined in the already closed loop before the same can begin to react. While this is not mandatory it is desirable, as it is desirable also to have the sheet material turned and oriented in its final basic vertical orientation as shown in FIG. 14 before the foam components react to avoid creating an unnecessary twist in the containment boom. As shown in FIG. 14, the injector nozzle 92 protrudes into the loop from a position forward of the sealing mechanism, schematically represented by the rollers 94, preferably reaching sufficiently aft of the sealing mechanism so as to confine the liquid foam reactants prior to and as the foaming reaction progresses. Of course at this stage the skirt 96 may be folded in a random manner to reduce the vertical height required, or alternatively at the same time may pass through a second sealer for sealing a loop adjacent the other edge of the flexible material for containing a weight 98 as shown in FIG. 15. Here the weight may be a series of individual weights or a continuous weight in the form of a wire or cable provided from a roll 100 (See FIG. 12). Of course, the same loop as contains the weight 98 in FIG. 15 may also provide the chamber for acting as a sea anchor hereinbefore described.

Referring again to FIG. 12, there is shown therein a feedback from one of the rollers 30 over which the containment boom is deployed, to the injector 28a and to the sealer 28b. Such feedback in the roller speed may be used to control the rate at which the foam reactants are mixed and injected so that reasonable variations in the boat speed may be made while at the same time maintaining the injection of the proper amount of foam reactants over the variation in speed encountered. Similarly, depending upon the nature of the sealer 28b, the feedback thereto may be appropriate for proper regulation thereof with operating speed of the system.

Referring now to FIG. 13, a block diagram of the apparatus for providing the foam may be seen. Foam reactants of the type generally described are two part liquid material(s) which when mixed will quickly react to form the foam. Because such materials are temperature sensitive, or at least have a shelf life which is highly temperature dependent, it is preferred to store the materials in a temperature controlled region 100, with the two components being pumped therefrom in the proper proportion and mixed by a mixer 102 for delivery to the injector 92 when needed. If desired, as shown in the schematic diagram of FIG. 16, reinforcing fibers of glass, kevlar or other materials may be chopped and injected by an injector 104 into the foam compounds prior to their foaming substantially so as to perhaps better tailor the characteristics of the foam to the application. Finally, if desired, a pinching apparatus 106 (FIG. 12) may be provided to restrain the foam filled loop to an oblong cross section as illustrated in FIG. 8 and/or to periodically pinch the same to form individual floatation chambers and/or individual weight chambers along the length of the containment boom. Provided such pinching occurs at the appropriate time during the reaction process, the pinching time required for the desired result to be achieved may be kept relatively low.

As illustrated in FIG. 17, the bonding of the one or more loops in the containment booms hereinbefore described may be achieved by preapplying pressure or heat sensitive adhesives to the strip of flexible material such as illustrated in FIG. 17. Here the strip of flexible material coming off the roll has been provided with a plurality of strips of suitable adhesives which, with the proper application of heat, pressure, or both, may form the desired bond or bonds with a minimum of sophistication in the bonding apparatus required on board the boat.

Figure 18:
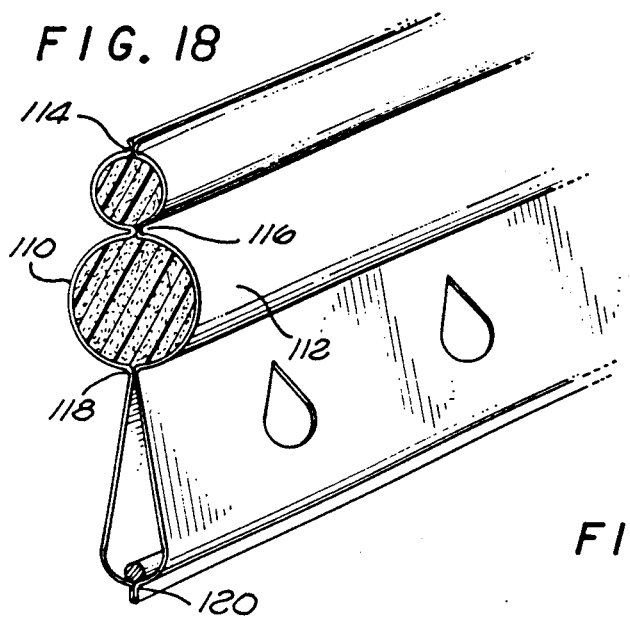
FIG. 18 is a cross section of another embodiment of the present invention.

Now referring to FIG. 18, a cross section of an embodiment of the present invention illustrating another boom structure resulting from the use of a modified containment boom fabrication method may be seen. This embodiment may be dimensionally the same as the embodiment illustrated and described with respect to FIG. 11. However, rather than being fabricated from a single sheet of flexible material folded adjacent each edge thereof, the same is fabricated from two sheets of material 110 and 112, joined in regions 114, 116, 118 and 120. As before, any of a number of joining methods may be used, many of which have been hereinbefore mentioned. One joining method which has not been mentioned but which has been found to be highly satisfactory is stapling, as stapling guns using wire on a roll are highly reliable and of course also operable at any speed from zero to their upper limit. Also while a stapled seam is not a hermetically sealed seam, the same will be adequately sealed for the purposes, particularly if foam reactants are not injected directly onto the seam while the same are still in a very liquid state, as opposed to at least being in the process of foaming.

Figure 19:
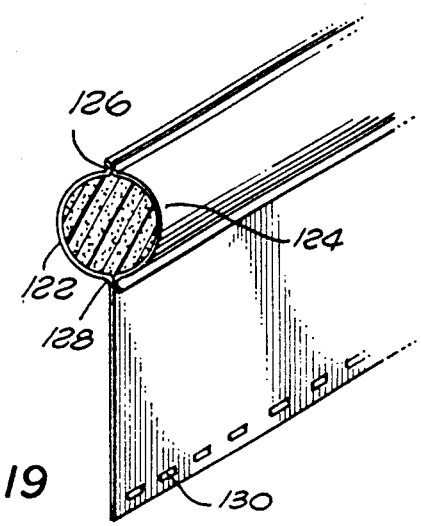
FIG. 19 is a cross section of a still further embodiment of the present invention similar in certain respects to the embodiment of FIG. 18.

The process of stapling also may be used for "attaching" the weight to the skirt of the containment boom, the staples themselves providing the weight through the use of an appropriate sized wire therefor and appropriate staple spacing. Also while the two sheets of the material 110 and 112 are of equal width in the embodiment of FIG. 18, such is by no means a limitation of the present invention. Thus, as shown in FIG. 19, a relatively wide sheet of material 122 and a relatively narrow sheet of material 124 are joined in regions 126 and 128 to form the desired loop at the top of the containment boom, while a row of staples 130 are spaced adjacent the bottom edge of sheet 122, the size and spacing of the staples determining the weight per unit length, which for that matter could be varied depending upon whether the spill is in a harbor versus open sea and/or for that matter as may be determined by sea conditions. The advantage of using the two sheets of course, rather than a single sheet which is folded, is that the rolls of material as provided by the material manufacturer may be used directly, or at most simply processed and rerolled to form the roll of material ready for use. In comparison to a single folded sheet, much narrower material, therefore more readily available, may be used. Also, if the material is folded at the time of deployment, such folding will require additional equipment and space (size of the deployment boat for accomplishing the folding) or alternatively, if the sheet is prefolded, the same may not roll up well and form a nice smooth roll for possibly prolonged storage before use. Further, for a given length boom, two smaller rolls of flexible material are easier to handle and control during deployment, and have the potential of allowing the deployment of a greater containment boom length than could be practically provided by a single roll. Obviously with respect to the joining technique one could readily use a different joining technique, for each "seal". By way of example, in the embodiment of FIG. 19, the joining technique used along the top of the loop might be a simple "lightweight" stapling, whereas the joint along the bottom in region 128 might be any of the various other techniques hereinbefore mentioned, including by way of example, stitching or stapling, though at the same time threading a small elastic strip between the two sheets where they are to be joined, such as by way of example a closed cell foam strip, so that the space between staples or stitches will be quite well sealed preventing leakage of even totally liquid foam reactant therethrough during deployment.

Figure 20:
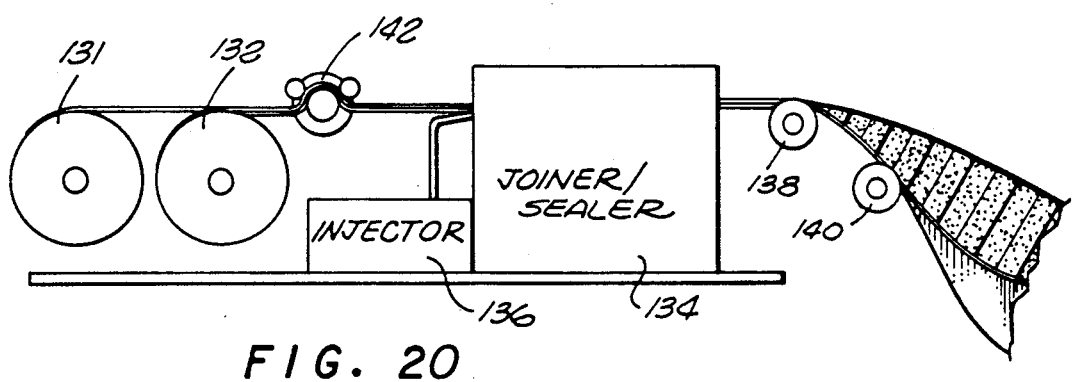
FIG. 20 is a schematic diagram of the containment boom fabricating equipment for use in making the embodiments of the present invention of FIGS. 18 and 19.
Figure 21:
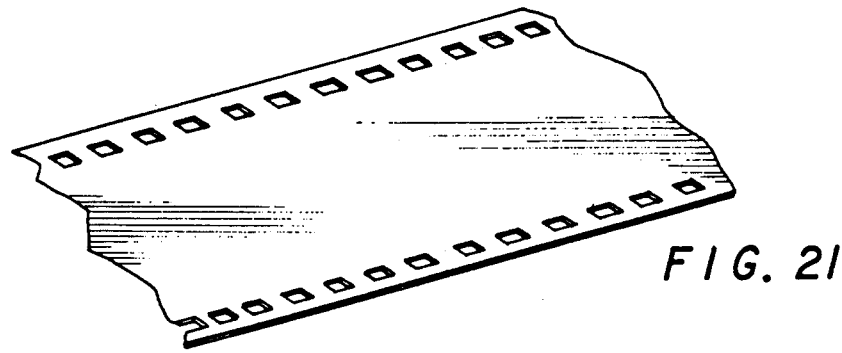
FIG. 21 is a view of a sheet of flexible material used for the present invention illustrating sprocket holes therein adjacent to the side edges thereof.

Now referring to FIG. 20, a diagram similar to FIG. 1 illustrating the use of two rolls of material to form the containment boom in the present invention such as illustrated in FIGS. 18 and 19 may be seen. Here rolls 131 and 132 provide the two layers of material which pass through joiner/sealer 134 to be joined at the appropriate locations to form the loop or loops therein in accordance with the embodiment of the containment boom being fabricated. Of course as before, an injector such as injector 136 injects the filler material into the applicable loop, with the boom taking shape as the same is deployed over rollers 138 and 140 at the stern of the boat. For guidance purposes, the material on rolls 131 and 132 may be perforated adjacent to the edges thereof as shown in FIG. 21 (the size of the perforations being exaggerated in the scale for clarity) so that the material from the two rollers may be aligned, guided and driven by sprocketfeed mechanism 142 (see FIG. 20) much like the tractor feed for tractor feed computer paper. Such perforation, if used, may be done by the material manufacturer or alternatively done during an unrolling and rerolling of each roll of material.

Figure 22:
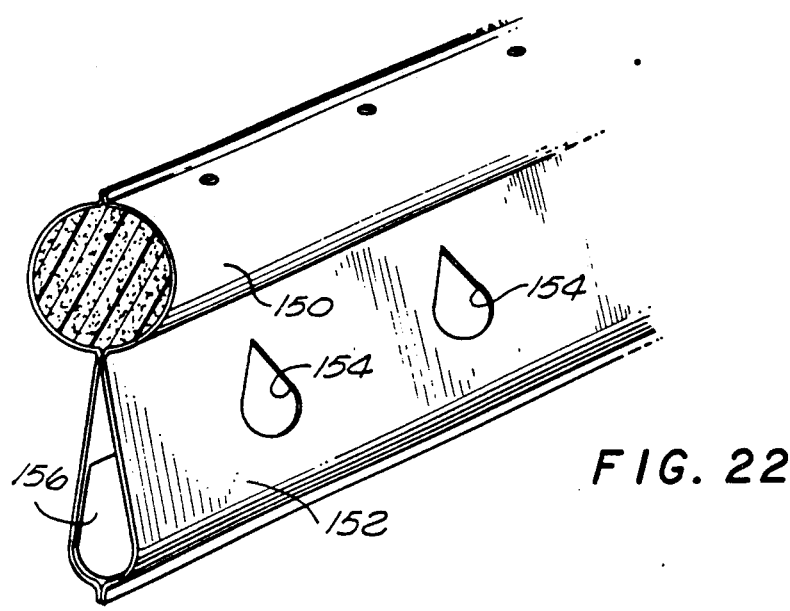
FIG. 22 is a cross section of a preferred embodiment of a containment boom of the present invention.
Figure 23:
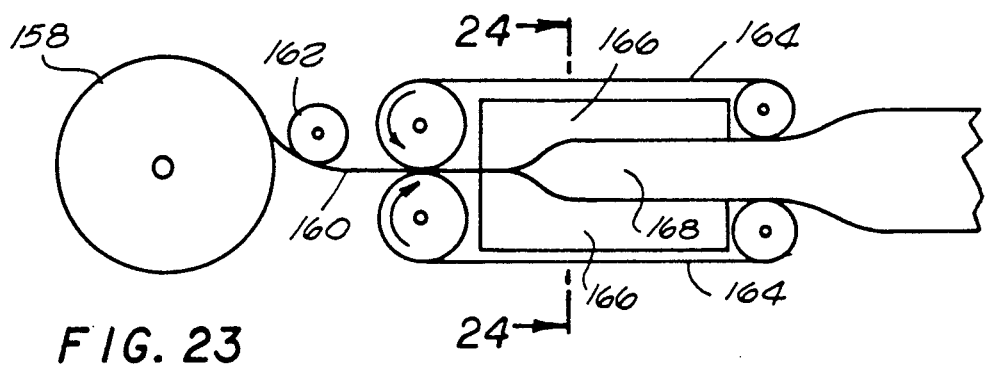
FIG. 23 is a top view of the containment boom forming apparatus for forming at the time of deployment the containment boom of FIG. 22.
Figure 24:
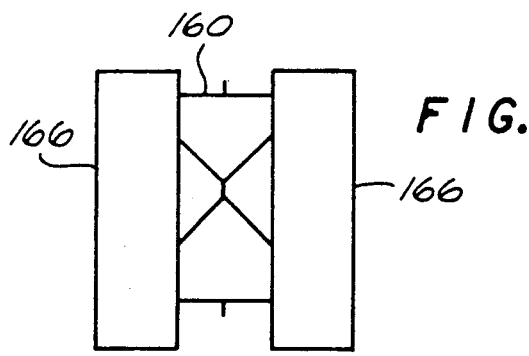
FIG. 24 is a cross section taken along line 24—24 of FIG. 23.
Figure 25:
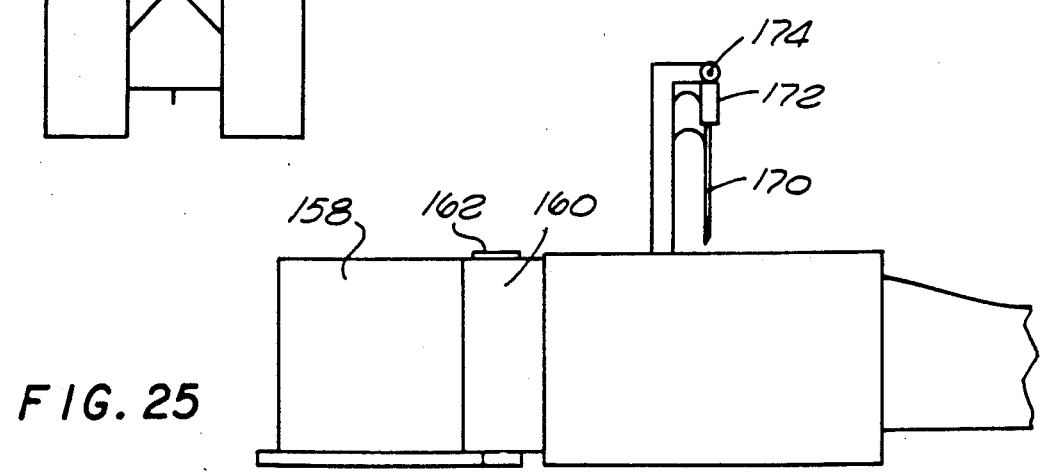
FIG. 25 is a side view of the apparatus of FIG. 23 illustrating the injection tube for the foam forming reactants.

Now referring to FIG. 22, a still further embodiment of the present invention may be seen. This embodiment utilizes a fiber reinforced plastic sheeting material, the exact form shown comprising two sheets of 0.003 inch material joined together along three lines to define an upper chamber 150 filled with foam, and a lower sea anchor chamber 152 having openings 154 therein for encouraging water thereinto upon the upward movement of the containment boom through the water. Bonded or otherwise fastened to the inside wall of chamber 152 is a sheet of appropriate weighting material 156, such as a lead foil or other suitable material. This embodiment, prior to deployment, is folded flat (the weight foil being folded in a V shape as a consequence thereof) and provided in roll form on a large roll 158. As may be seen in the top view of the containment boom forming apparatus of FIG. 23 and the side view of that apparatus as shown in FIG. 24, during deployment the flattened material 160 is pulled off of roll 158 in a vertical orientation as guided by vertical roller 162, and then passes between two flexible facingly disposed conveyor belts 164, each traveling in the direction indicated. The conveyor belts are in an open form such as, by way of example, having a plurality of openings therethrough and pass between hollow compartments 166 which are maintained at a reduced pressure by being coupled to the intake of an appropriate blower. The face of the hollow compartments 166 adjacent the conveyor belts, which in turn is adjacent to the material 160, is also of an open structure so that the reduced pressure therein is communicated to the opposite sides of material 160. Thus the loops in the material are pulled into an open condition as the material and conveyor belts proceed into region 168 wherein the compartments 166 and the conveyor belts 164 have a substantial separation. This may be seen in FIG. 24, which is a schematic cross section of the chambers 166 and the material 160 as the loops therein, including the weight foil, are pulled into the open condition.

As the conveyor system moves the opened material through the system, a sharpened foam reactant dispensing tube 170 is forced downward by an actuator 172 to puncture the upper loop in the material and to dispense the mixed foam reactants in a proper amount into the upper loop of the material. The reactant dispensing tube 170 and actuator 172 are pivotally supported on pivot 174, so that the tube may swing rearward to move with the material during dispensing, thereafter being withdrawn to return to the position shown for subsequent puncturing and dispensing operations. By way of example, the puncturing and foam reactant dispensing operation might be repeated approximately every three feet of deployment boom being deployed, the amount of foam reactants being dispensed being appropriate to react to fill a three foot length of the upper loop of the containment boom. The puncturing caused by the dispensing tube does not affect the floatation provided by the foam, even when an open celled foam is used, partially because any free surface of foam skims over during the reaction process, and for the further reason that tests have shown that while some water is absorbed by the open celled foam, substantial punctures may be made in the resulting float chamber without really functionally affecting the operation of the present invention over any reasonable period of use thereof. Further, the punctures can serve a useful purpose in allowing the loop to breath as the loop is opened by the system, and allowing the escape of air and/or excess foam, if too much foam is injected or alternatively the foam expands a bit more than expected. In that regard, depending upon the materials used, excessive foam forming reactants can create sufficient pressure in a sealed loop to rupture the same. Thus, it may even be desirable to provide a small blade on the end of the injection tube so that the opening made by the tube will be larger than the mere diameter of the tube itself. Alternatively, if the containment boom material is made by bonding or otherwise securing two sheets of material together, the seal along the top thereof may be intermittent such as, by way of example, by leaving three inches unsealed every two feet of length of the boom material. Now when the material is pulled open, the unsealed regions will also open, into which the foam reactants could be injected if desired, though additional small punctures for the injection tube can perhaps be more easily used without consequence.

The foregoing embodiment is actually preferred, as it minimizes the number of operations which must be carried out at the time of deployment by using the maximum amount of prefabrication while still maintaining the capability of providing great lengths of containment boom on a single roll. The use of the lead foil or other weight material foil is advantageous not only because the same will more readily roll up as desired, but for the further reason that when the same is pulled open it will tend to stay open, aiding in the sea anchor-like operation of the boom skirt.

In the foregoing description, the system has been described as being contained on and the containment boom deployed from a boat, typically a rather small boat which could be carried on the tanker itself, as the small boat traverses the spill. It should be understood, however, that the general principles of the present invention may be used in other ways. By way of example the equipment for fabricating the containment boom may be contained on a boat, barge or even a dock, with the containment boom being deployed therefrom by an even smaller boat pulling the free end thereof as desired. It could even be deployed from the offending tanker itself in this way using a small boat, particularly if the equipment was hoisted over the side on a platform to just above water level. Here the small boat is no longer of particularly special design, and can be used for other duty such as for a shore boat, thereby justifying its cost on other grounds and keeping the same in good working order throughout the useful life of the tanker even in the hopeful event it is never needed for use as part of the present invention.

In the preferred embodiments of the present invention an open celled foam is used because of the very low density of the resulting foam, thereby minimizing the volume and weight of reactants needed to form the foam. However, numerous other materials may be used, such as by way of example a closed cell foam, heat expandable polystyrene or even a compacted sponge, though the closed cell foam and especially the compacted sponge will have a substantially higher density in its final useful form than the open celled foam, thereby requiring a greater volume and weight of such materials in the unreacted or compacted state to achieve the desired result. Also as used herein and in the appended claims, the word loop is meant to include not only a loop formed by folding, but also loops effectively formed by bonding or otherwise joining two sheets of material along spaced apart lines.

After one of the containment booms of the present invention has been deployed and served its useful purpose, the same is not intended for reuse but rather is intended to be recovered for disposal which may readily be achieved by chopping up the oil boom and melting the same for disposal as it is recovered. For this purpose it is convenient to use as the weight for the skirt a cable which will aid in drawing the boom back on board a boat and which may be recovered for recycling and/or reuse by separating the same from the remainder of the boom before chopping and melting the same. Use of a cable for the weight also has the advantage that during deployment a sea anchor may be affixed to the end of the cable to anchor the same and thus the containment boom. against drifting, particularly along the length thereof toward the deployment boat.

There has been disclosed and described herein new and unique oil booms together with unique methods of fabricating the same which will allow the rapid deployment of great lengths of containment boom for maximum effectiveness in containing and facilitating the recovery of floating materials on a body of water. Obviously while certain preferred embodiments of the present invention have been disclosed and described herein, it will be understood by those skilled in the art that various changes in form and detail may be made therein without departing from the spirit and scope thereof.

What is claimed is:

1. A floating containment boom comprising:
   a continuous elongate flexible sheet material having first and second edges extending along its length, said flexible material being formed in a loop adjacent said first edge thereof and filled with foamed in place plastic foam that is disposed within said loop during said formation of said loop; and,
   weight means adjacent said second edge of said flexible material, said weight means having a density substantially greater than the density of sea water;
   whereby the foamed in place plastic foam will cause a substantial part of said loop to float on water and said weight means will cause the portion of said sheet of flexible material adjacent said second edge to sink in water, thereby forming a barrier for containing petroleum product and similar floating materials on a body of water.

2. The floating containment boom of claim 1 wherein said flexible material is a filament reinforced plastic material.

3. The floating containment boom of claim 1 wherein said flexible material is formed in a second loop adjacent said second edge thereof, said weight means being disposed in said second loop.

4. The floating containment boom of claim 3 wherein said second loop has openings therein disposed to encourage the egress of air out of said second loop.

5. The floating containment boom of claim 4 wherein said second loop has openings therein disposed to encourage the ingress of water into said second loop.

6. The floating containment boom of claim 3 wherein said weight means is a substantially continuous weight means.

7. The floating containment boom of claim 3 wherein said second loop is divided into separate compartments and a part of said weight means is disposed in each of said compartments.

8. The floating containment boom of claim 1 wherein said foamed in place plastic foam is a closed cell foam.

9. The floating containment boom of claim 1 wherein said foamed in place plastic foam is an open cell foam.

10. The floating containment boom of claim 1 wherein said flexible material is formed in a plurality of loops adjacent said first edge thereof, each loop being filled with foamed in place plastic foam.

11. The floating containment boom of claim 1 wherein said loop filled with foam is substantially round.

12. The floating containment boom of claim 1 wherein said loop filled with foam deviates substantially from being round.

13. The floating containment boom of claim 1 wherein said loop filled with foam has regions along its length dividing the same into a plurality of foam filled chambers.

14. The floating containment boom of claim 1 wherein said flexible material is a fiber reinforced plastic material.

15. A method of deploying a floating containment boom comprising the steps of:
  (a) providing elongate flexible material having first and second edges extending along its length;
  (b) providing weight means adjacent the second edge of the flexible material, the weight means having a density substantially greater than the density of sea water;
  (c) forming the flexible material in a loop adjacent the first edge thereof, and;
  (d) disposing foam forming reactants in the loop adjacent the first edge as the flexible material is being deployed as a part of the floating containment boom, the foam forming reactants foaming in place to substantially fill the loop with plastic foam;
  whereby the foamed in place plastic foam will cause a substantial part of the loop to float on water and the weight means will cause the portion of the flexible material adjacent the second edge to sink in water, thereby forming a barrier for containing petroleum product and similar floating materials on a body of water.

16. The method of claim 15 wherein in step (b), the weight means is provided adjacent the second edge of the flexible material prior to the deployment of the flexible material as a part of the floating containment boom.

17. The method of claim 15 wherein in step (b), the weight means is provided adjacent the second edge of the flexible material at the time of deployment of the flexible material as a part of the floating containment boom.

18. The method of claim 15 wherein in step (b), the weight means is a single elongate weight means.

19. The method of claim 15 wherein in step (d), the foam forming reactants are disposed in the loop as the flexible material is being deployed as a part of the floating containment boom at a rate dependent on the rate of deployment of the flexible material.

20. The method of claim 15 wherein the flexible material is preformed in a loop adjacent the first edge thereof, and in step (d), the foam forming reactants are disposed in the loop as the flexible material is being deployed through openings in the loop.

21. The method of claim 15 wherein the flexible material is preformed in a loop adjacent the first edge thereof, and in step (d), the foam forming reactants are disposed in the loop as the flexible material is being deployed through openings left in the loop when it was preformed.

22. The method of claim 15 wherein the flexible material is preformed in a loop adjacent the first edge thereof, and in step (d), the foam forming reactants are disposed in the loop as the flexible material is being deployed through openings pierced in the loop at the time of deployment of the containment boom.

23. The method of claim 15 wherein the flexible material is permanently joined in a loop adjacent the first edge thereof as the flexible material is being deployed as a part of the floating containment boom, and in step (d), the foam forming reactants are disposed in the loop from a position at which the flexible material is not yet permanently joined in a loop as the flexible material is being deployed as a part of the floating containment boom.

24. The method of claim 15 wherein in step (c), the flexible material is prefolded in a loop and stored in a roll prior to deployment.

25. The method of claim 15 wherein in step (b), the flexible material is folded and secured in a loop adjacent the second edge thereof and the weight means is disposed in the loop so formed.

26. The method of claim 25 wherein in step (b), the flexible material is prefolded adjacent the second edge thereof, and the weight means disposed in the loop and the loop secured at the time of deployment of the containment boom.

27. The method of claim 26 wherein the weight means is a continuous weight stored on a reel until deployment of the containment boom.

28. The method of claim 15 wherein in step (b), the flexible material is secured in a loop adjacent the second edge thereof and the weight means is in a sheet form bonded to the flexible material and disposed in the last named loop.

29. The method of claim 28 wherein the loop adjacent the second edge has openings therein disposed to encourage the egress of air out of the loop and to encourage the ingress of water into the loop.

30. The method of claim 29 wherein the loop adjacent the second edge is encouraged open at the time of deployment.

31. The method of claim 15 wherein the flexible material is a filament reinforced plastic material.

32. The method of claim 15 wherein the flexible material has at least one compartment adjacent the second edge thereof having openings therein disposed to encourage the egress of air out of the compartment and to encourage the ingress of water into the compartment.

33. The method of claim 32 wherein the weight means is disposed within the compartment.

34. The method of claim 15 wherein in step (d), the foamed in place plastic foam is a closed cell foam.

35. The method of claim 15 wherein in step (d), the foamed in place plastic foam is an open cell foam.

36. The method of claim 15 wherein in step (c), the flexible material is folded in a plurality of loops adjacent the first edge thereof, each loop being filled with foamed in place plastic foam.

37. The method of claim 15 wherein in step (d), the loop filled with foam expands to be substantially round.

38. The method of claim 15 wherein in step (d), the loop filled with foam is restrained for a sufficient time as foaming progresses so that the final cross section of the loop deviates substantially from being round.

39. The method of claim 15 wherein in step (d), the loop filled with foam is pinched periodically on deployment and held briefly as the foam forms to provide regions along the containment boom dividing the same into a plurality of foam filled chambers.

40. A method of deploying a floating containment boom comprising the steps of:
  (a) providing elongate flexible material having first and second edges extending along its length, the flexible material having a longitudinal compartment adjacent the first edge thereof;
  (b) providing weight means adjacent the second edge of the flexible material, the weight means having a density substantially greater than the density of sea water; and,
  (c) disposing foam forming reactants in the compartment adjacent the first edge as the flexible material is being deployed as a part of the floating containment boom, the foam forming reactants foaming in place to substantially fill the compartment with plastic foam;
  whereby the foamed in place plastic foam will cause a substantial part of the compartment to float on water and the weight means will cause the portion of the flexible material adjacent the second edge to sink in water, thereby forming a barrier for containing petroleum product and similar floating materials on a body of water.

41. The method of claim 40 wherein in step (b), the weight means is provided adjacent the second edge of the flexible material prior to the deployment of the flexible material as a part of the floating containment boom.

42. The method of claim 40 wherein in step (c), the foam forming reactants are disposed in the compartment as the flexible material is being deployed as a part of the floating containment boom at a rate dependent on the rate of deployment of the flexible material.

43. The method of claim 42 wherein in step (c), the foam forming reactants are disposed in the compartment as the flexible material is being deployed through openings left in the compartment when it was preformed.

44. The method of claim 42 wherein in step (c), the foam forming reactants are disposed in the compartment as the flexible material is being deployed through openings pierced in the compartment at the time of deployment of the containment boom.

45. The method of claim 40 wherein the flexible material is stored in a roll prior to deployment.

46. The method of claim 40 wherein in step (b), the flexible material has a compartment adjacent the second edge thereof and the weight means is disposed in the last named compartment.

47. The method of claim 46 wherein in step (b), the flexible material has a compartment adjacent the second edge thereof and the weight means is in a sheet form bonded to the flexible material and disposed in the last named compartment.

48. The method of claim 47 wherein the compartment adjacent the second edge has openings therein disposed to encourage the egress of air out of the compartment and to encourage the ingress of water into the compartment.

49. The method of claim 48 wherein the compartment adjacent the second edge is encouraged open at the time of deployment.

50. The method of claim 49 wherein the flexible material is a filament reinforced plastic material.

51. The method of claim 40 wherein the flexible material has at least one preformed compartment adjacent the second edge thereof having openings therein disposed to encourage the egress of air out of the compartment and to encourage the ingress of water into the compartment.

52. The method of claim 51 wherein the weight means is disposed within the compartment.

53. The method of claim 40 wherein in step (d), the foamed in place plastic foam is a closed cell foam.

54. The method of claim 40 wherein in step (d), the foamed in place plastic foam is an open cell foam.

55. A method of deploying a floating containment boom comprising the steps of:
  (a) providing elongate flexible material having first and second edges extending along its length, the flexible material having a longitudinal compartment adjacent the first edge thereof;
  (b) providing weight means adjacent the second edge of the flexible material, the weight means having a density substantially greater than the density of sea water; and,
  (c) disposing expanding material in the compartment adjacent the first edge as the flexible material is being deployed as a part of the floating containment boom, the expanding material expanding in place to substantially fill the compartment with plastic foam;
  whereby the expanded material will cause a substantial part of the compartment to float on water and the weight means will cause the portion of the flexible material adjacent the second edge to sink in water, thereby forming a barrier for containing petroleum product and similar floating materials on a body of water.

* * * * *